(12) United States Patent
Rosko et al.

(10) Patent No.: US 7,987,869 B2
(45) Date of Patent: Aug. 2, 2011

(54) VALVE STEM HOLDING DEVICE

(75) Inventors: Michael Scot Rosko, Greenwood, IN (US); Patrick B. Jonte, Zionsville, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 369 days.

(21) Appl. No.: 12/333,589

(22) Filed: Dec. 12, 2008

(65) Prior Publication Data

US 2010/0147407 A1    Jun. 17, 2010

(51) Int. Cl.
*F16K 21/00*    (2006.01)
*F16B 39/00*    (2006.01)

(52) U.S. Cl. .................. 137/315.15; 137/359; 137/801; 4/678; 411/190

(58) Field of Classification Search ............. 137/315.15, 137/15.17, 15.18, 359, 801, 315.12; 4/678; 411/190
See application file for complete search history.

(56) References Cited

U.S. PATENT DOCUMENTS

| 5,025,826 | A | * | 6/1991 | Schoepe et al. | .......... 137/315.15 |
| 5,439,197 | A | | 8/1995 | Itoi et al. | |
| 5,826,788 | A | * | 10/1998 | Redding | ........................ 251/355 |
| 5,947,149 | A | | 9/1999 | Mark | |
| 6,206,338 | B1 | | 3/2001 | Trail et al. | |
| 6,279,604 | B1 | * | 8/2001 | Korb et al. | ..................... 137/359 |
| 6,371,957 | B1 | * | 4/2002 | Amrein et al. | ................ 606/272 |
| 6,438,771 | B1 | * | 8/2002 | Donath et al. | .................... 4/678 |
| 7,231,935 | B2 | * | 6/2007 | Huang | ..................... 137/315.15 |
| 7,461,669 | B2 | * | 12/2008 | Jonte et al. | ................. 137/454.5 |
| 7,540,300 | B2 | * | 6/2009 | Thomas et al. | ............... 137/359 |
| 2005/0236047 | A1 | | 10/2005 | Thomas et al. | |
| 2009/0204115 | A1 | * | 8/2009 | Dees et al. | ....................... 606/62 |

FOREIGN PATENT DOCUMENTS

SU    1670278    8/1991

* cited by examiner

*Primary Examiner* — Kevin Lee
(74) *Attorney, Agent, or Firm* — Baker & Daniels LLP (57) ABSTRACT

The present invention relates to a device for holding a faucet handle to a valve stem. The device tightens onto the valve stem when drawn upwardly into the faucet handle.

38 Claims, 8 Drawing Sheets

VALVE STEM HOLDING DEVICE

BACKGROUND AND SUMMARY

The present disclosure relates generally to a device for holding a faucet handle to a valve stem. More particularly, the disclosure relates to a collet that tightens onto a valve stem when coupled to a faucet handle.

Many faucet systems utilize set screws to couple a faucet handle to a valve stem. In these systems, the set screws are prone to loosening, causing the faucet handle to loosen from the valve stem. Over-tightened set screws may cause the faucet handle to jam into the valve assembly or the faucet body. Further, the set screws are typically visible on the outside of the faucet handle, thereby reducing the aesthetic appearance of the faucet system.

According to an illustrative embodiment of the present disclosure, a faucet assembly includes a handle body having a receiving chamber defining a longitudinal axis, and a valve assembly having a valve stem. The faucet assembly further includes a collet having a clamping portion for receiving the valve stem, wherein the clamping portion is received within the receiving chamber of the handle body and wherein axial movement of the handle body into the receiving chamber causes a radial force on the clamping portion to grip the valve stem.

According to a further embodiment of the present disclosure, a collet for holding a faucet handle body to a valve stem is provided, wherein the faucet handle body has a receiving chamber with a substantially tapered portion. The collet includes a coupling portion for securing the collet to the faucet handle body, and a clamping portion for receiving the valve stem. The clamping portion has a substantially tapered outer surface configured to cooperate with the substantially tapered portion of the receiving chamber and thereby clamp the clamping portion onto the valve stem.

According to another illustrative embodiment of the present disclosure, a faucet assembly includes a handle body having a receiving chamber, wherein the receiving chamber has a substantially tapered inner surface. A valve assembly includes a valve stem, and a collet includes a coupling portion for securing the collet to the handle body and a clamping portion for receiving the valve stem. The clamping portion has a substantially tapered outer surface configured to cooperate with the substantially tapered inner surface of the receiving chamber to clamp the clamping portion onto the valve stem.

According to yet another illustrative embodiment of the present disclosure, a faucet assembly includes a handle body having a receiving chamber defining a longitudinal axis, and a valve assembly including a valve stem. A holding device is configured to hold the handle body to the valve stem, wherein the holding device is received within the receiving chamber of the handle body and is movable in a direction parallel to the longitudinal axis from an unlocked mode wherein the handle body is infinitely rotationally adjustable within a range of motion about the longitudinal axis relative to the holding device, to a locked mode wherein the handle body is rotationally locked to the holding device.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplification set out herein illustrates an embodiment of the disclosure, in one form, and such exemplifications are not to be construed as limiting the scope of the disclosure in any manner.

DETAILED DESCRIPTION OF THE INVENTION

The embodiment disclosed below is not intended to be exhaustive or limit the disclosure to the precise form disclosed in the following detailed description. Rather, the embodiment is chosen and described so that others skilled in the art may utilize its teachings.

Figure 1:
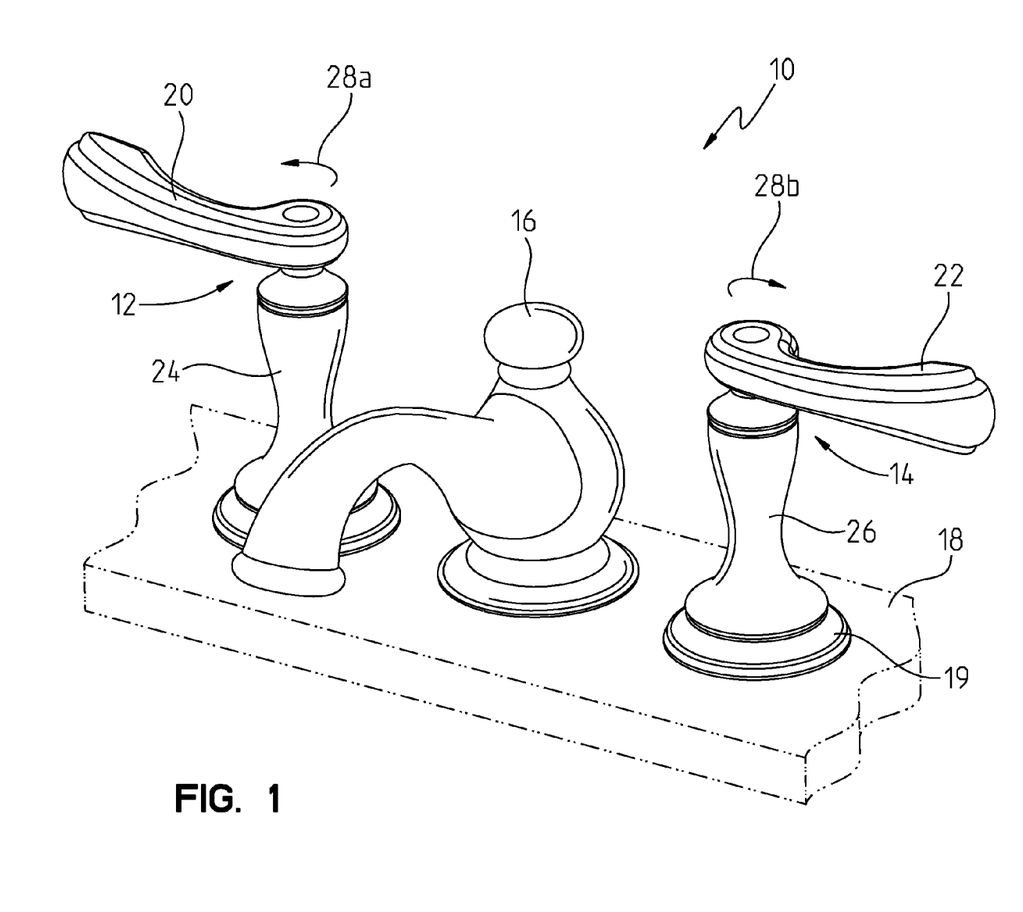
FIG. 1 is a perspective view of a lever type two handle faucet assembly wherein rotation of the levers toward the delivery spout activates water flow.
Figure 2:
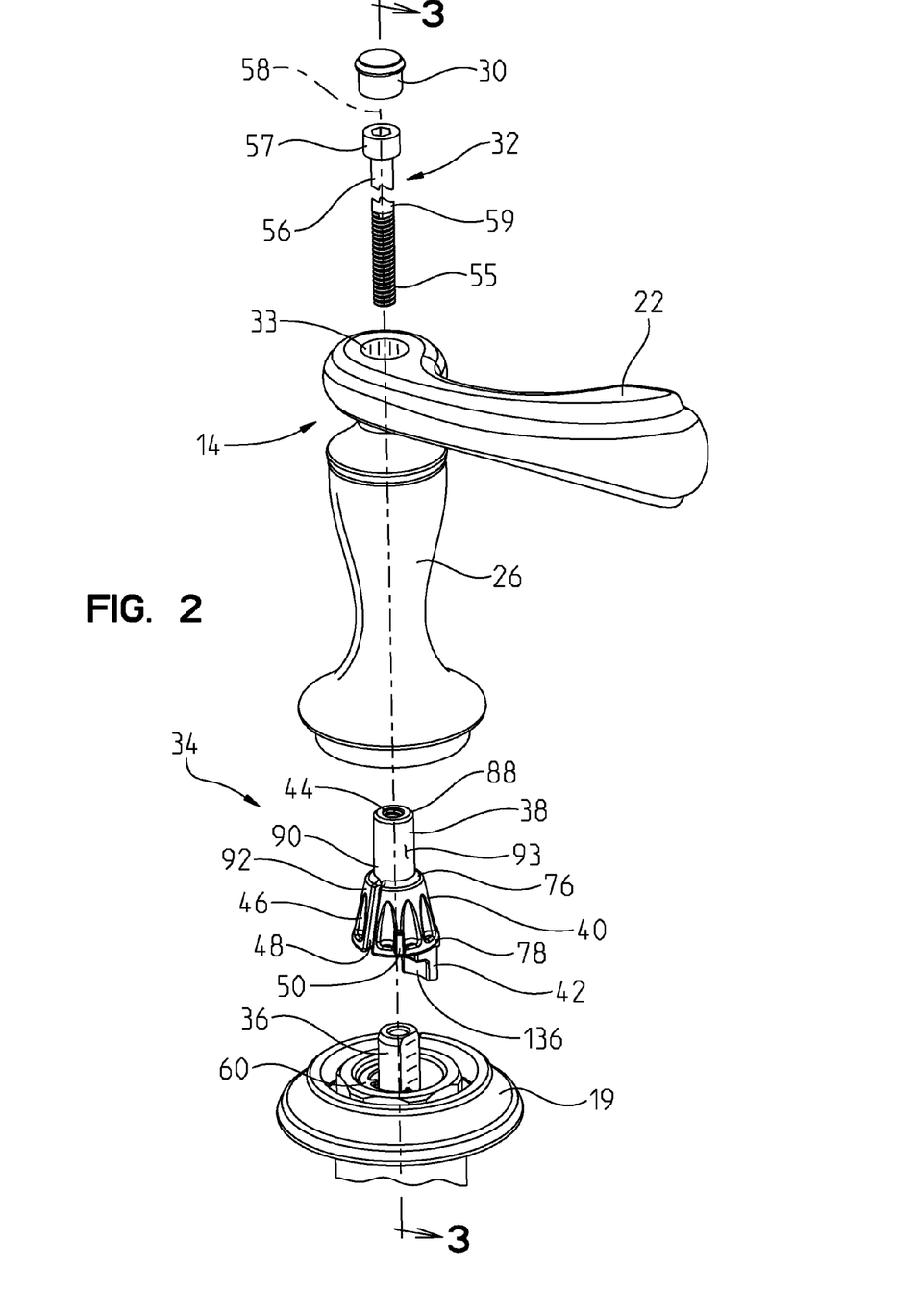
FIG. 2 is an exploded perspective view of a faucet handle, a collet, and a valve stem in a cold water orientation.

With reference to FIG. 1, an illustrative faucet assembly 10 is shown for use with a valve stem holding device, illustratively collet 34 of FIG. 2. Faucet assembly 10 is supported by a sink or mounting deck 18. Faucet assembly 10 includes a delivery spout 16 and hot and cold water faucet handles 12 and 14. As shown, hot and cold water faucet handles 12 and 14 are mounted in spaced relation to delivery spout 16. Hot water faucet handle 12 illustratively includes a lever 20 and a handle body 24, and cold water faucet handle 14 illustratively includes a lever 22 and a handle body 26. In the shown embodiment, the rotation of hot water faucet handle 12 in a counterclockwise direction along arrow 28a toward the delivery spout 16 initiates the flow of hot water. Similarly, the rotation of cold water faucet handle 14 in a clockwise direction along arrow 28b toward the delivery spout 16 initiates the flow of cold water. While the following description depicts collet 34 configured for use with cold water faucet handle 14, collet 34 may similarly be used in conjunction with hot water faucet handle 12. Additionally, while the drawings illustrate a lever-type faucet assembly 10, it should be appreciated that the collet 34 may be used with other faucet assemblies, including a knob-type faucet assembly including hot and cold water knobs (not shown), the rotation of which in counterclockwise directions initiate the flow of hot and cold water, respectively.

Figure 3:
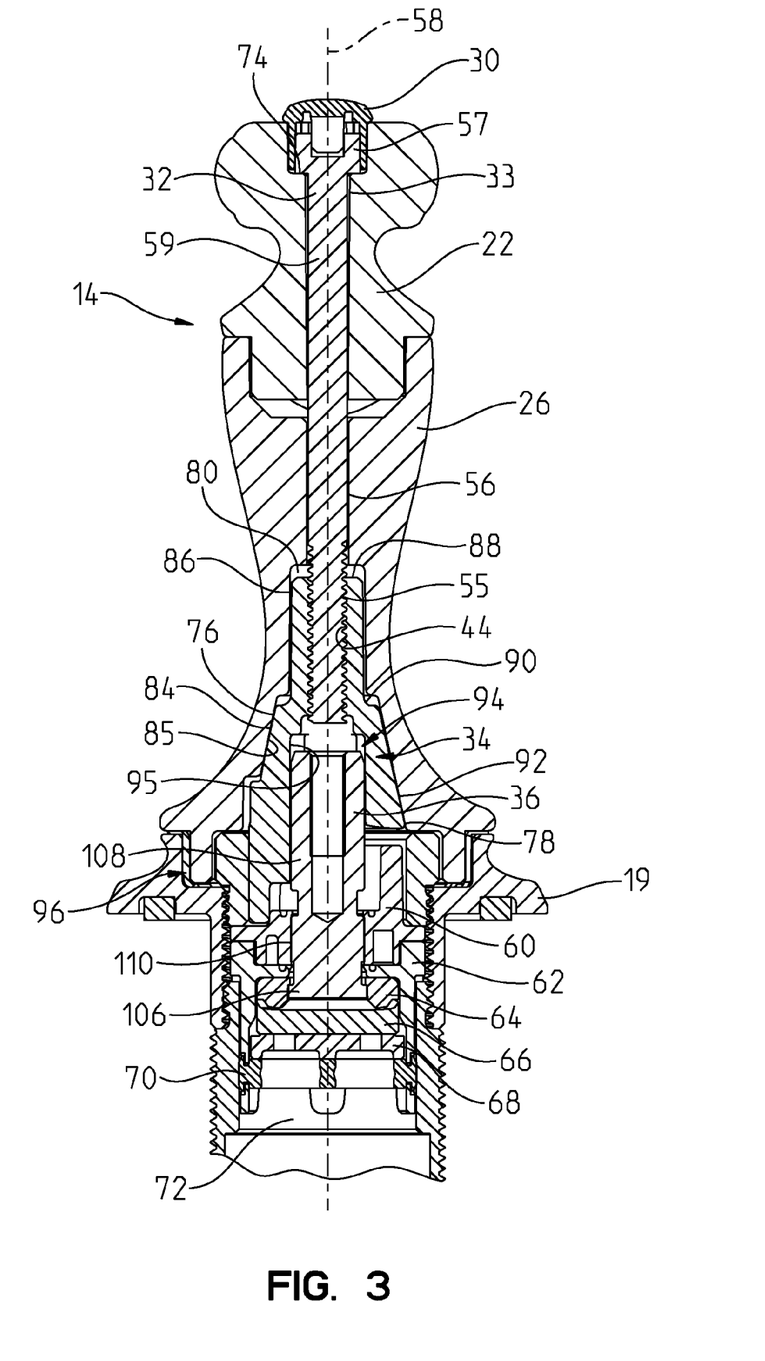
FIG. 3 is a cross-sectional view taken along the line 3-3 of FIG. 2.

Referring to FIGS. 2 and 3, collet 34 is configured to hold faucet handle 14 to a valve stem 36. Collet 34 is illustratively made of a polymer, although other suitable materials such as metals, including brass, may be used. Collet 34, as shown, includes a stem or coupling portion 38 and a clamping portion 40. Stem portion 38, centered along a longitudinal axis 58, includes a first stem end 88 and a second stem end 90 and a substantially cylindrical outer surface 93 extending therebetween. In the illustrated embodiment, stem portion 38 includes an internally threaded portion or opening 44. Threaded opening 44, centered along longitudinal axis 58, extends through stem portion 38 from first stem end 88 to second stem end 90.

Figure 6:
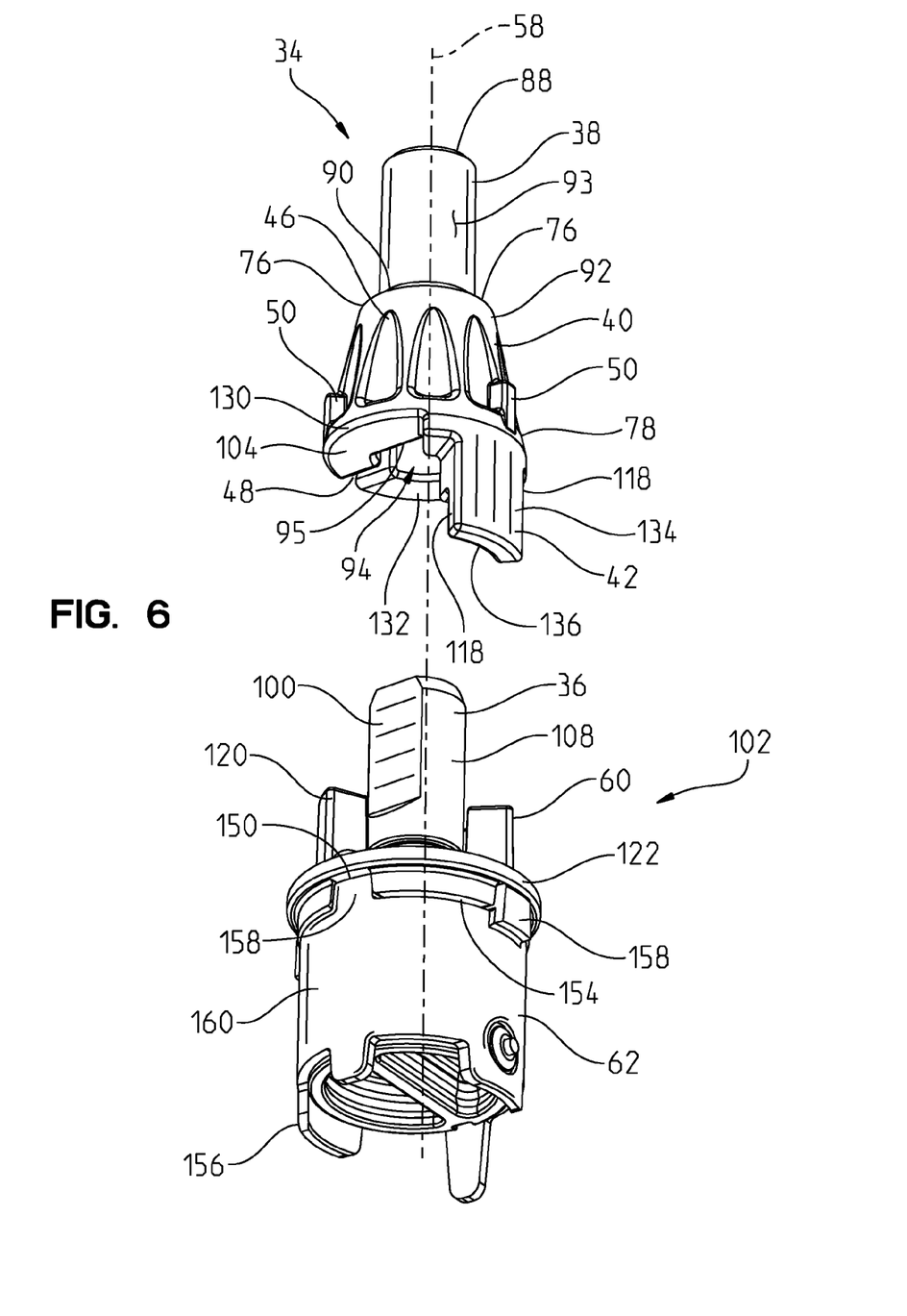
FIG. 6 is a partially exploded bottom perspective view of the collet of FIG. 2 positioned above a valve cartridge.

In the illustrated embodiment, clamping portion 40 is coaxial and integral with stem portion 38. Clamping portion 40 has a first clamping end 76, located adjacent to second stem end 90, and a second clamping end 78, located opposite first clamping end 76. Clamping portion 40 has an inner surface 95, best shown in FIGS. 3 and 6, and a substantially tapered frusto-conical outer surface 92, which tapers from second clamping end 78 to first clamping end 76. Inner surface 95 of clamping portion 40 defines an inner opening 94 centered along longitudinal axis 58 extending from first clamping end 76 to second clamping end 78. Inner opening 94 illustratively has a substantially D-shaped cross-section as taken in a horizontal plane normal to longitudinal axis 58 (FIG. 6). Alternatively, inner opening 94 may have other cross-sectional shapes or features to facilitate rotational locking, such as a circular or double D-shaped cross-section. An end wall or face 104 extends between outer surface 92 and inner surface 95 of clamping portion 40 proximate the second clamping end 78.

Figure 5:
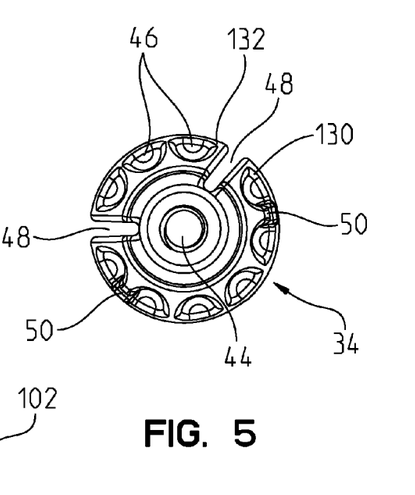
FIG. 5 is a top plan view of the collet of FIG. 2.

With reference to FIGS. 2 and 5, clamping portion 40 includes a first body 130 and a second body 132 separated by a pair of slots 48. Slots 48 are circumferentially spaced apart from each other by approximately 120 degrees, and extend from outer surface 92 to inner surface 95 and from first clamping end 76 to second clamping end 78. As such, second body 132 is slightly flexible or movable relative to first body 130. In the illustrated embodiment, first body 130 is substantially larger than second body 132 due to the spacing of slots 48. However, first body 130 and second body 132 may be any relative size.

Still referring to FIGS. 2 and 5, outer surface 92 of clamping portion 40 has a plurality of recesses or grooves 46 circumferentially located therein. Grooves 46 may be of any size or shape. As shown, grooves 46 are at least partially elongated and extend substantially from first clamping end 76 to second clamping end 78. As illustrated, grooves 46 are evenly spaced around outer surface 92 of clamping portion 40. Outer surface 92 of the illustrative clamping portion 40 includes a pair of tabs 50 extending radially outward from outer surface 92. Illustratively, tabs 50 are located near second clamping end 78, but tabs 50 alternatively may be located anywhere on outer surface 92. As best shown in FIG. 5, tabs 50 are circumferentially oriented on first body 130 approximately 120 degrees from each other. Alternatively, collet 34 may have any number of tabs 50 circumferentially oriented at any angle from each other. Furthermore, tabs 50 may be located on outer surface 93 of stem portion 38. In yet another illustrative embodiment, tabs 50 may be eliminated to provide for infinite incremental adjustment of handle body 26 relative to collet 34 as further detailed herein.

With reference to FIGS. 2 and 6, a stop member 42 extends longitudinally outwardly from end wall 104 of clamping portion 40. Stop member 42 has an inner face 136 and a substantially smooth outer face 134 extending between opposing surfaces 118. Outer face 134 is slightly curved and substantially parallel to longitudinal axis 58. Stop member 42 is illustratively integral with clamping portion 40.

Figure 7:
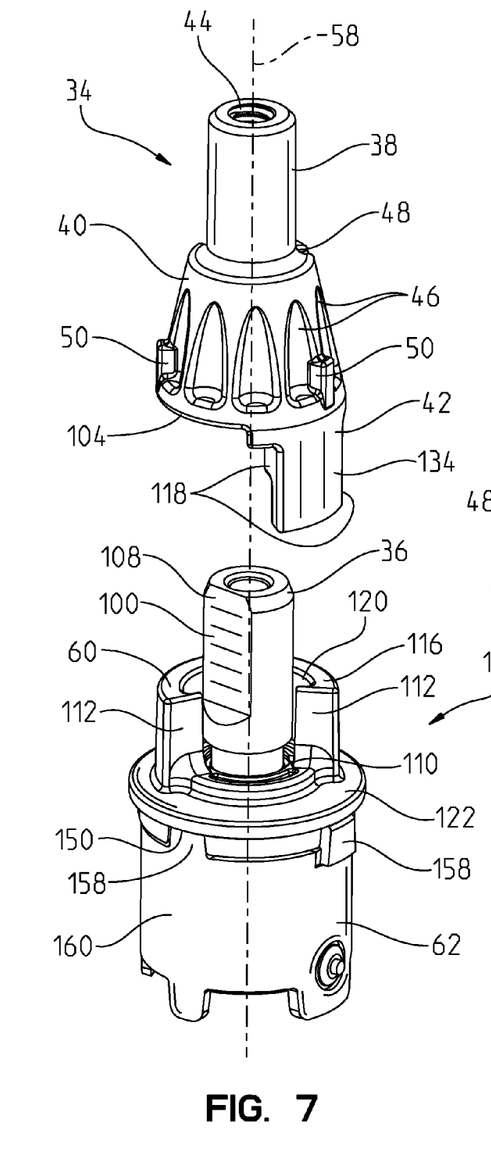
FIG. 7 is a partially exploded top perspective view of the collet of FIG. 2 positioned above a valve cartridge.

An illustrative valve assembly or cartridge 102 for use with faucet handle 14 and collet 34 is shown in FIGS. 3, 6 and 7. Valve cartridge 102 includes valve stem 36, a valve housing 62, and a valve cap 60. As illustrated, valve cartridge 102 is a cold water valve, although valve cartridge 102 may be a hot water valve. As shown in FIG. 3, faucet handle 14 is operably coupled to valve stem 36 of valve cartridge 102 through collet 34. Rotation of faucet handle 14 causes corresponding rotation of valve stem 36 along longitudinal axis 58 to control the flow of water through valve cartridge 102. Valve cartridge 102 may be similar to the type disclosed in further detail in U.S. Provisional Patent Application Ser. No. 61/132,664, filed Jun. 20, 2008, entitled "VALVE ASSEMBLY FOR A TWO HANDLE FAUCET," the disclosure of which is incorporated by reference herein.

Valve cap 60 of valve cartridge 102 includes a cap base 122 integral with a limit stop 120, as shown. Valve housing 62 includes a cylindrical side wall 160 and opposing first and second ends 154 and 156, respectively, centered along longitudinal axis 58. First end 154 of valve housing 62 is coupled to cap base 122 of valve cap 60, as illustrated. Side wall 160 of valve housing 62 includes a plurality of locating tabs 158 extending longitudinally outwardly from first end 154. Valve cap 60 is rotationally fixed in position relative to valve housing 62 by locating tabs 158 being received within corresponding notches 150 formed within cap base 122 of valve cap 60. Second end 156 of valve housing 62 is coupled to a base 72, as shown in FIG. 3, which is coupled to an inlet water conduit and an outlet water conduit (not shown). A gasket 70 provides a seal between valve housing 62 and base 72.

Referring further to FIG. 3, valve stem 36, illustratively formed of brass, includes a base 106 and a shaft 108. A central opening 110 of valve cartridge 102 extends longitudinally through valve housing 62 and valve cap 60 to receive shaft 108 of valve stem 36. A spacer or carrier 64, a first valve member 66, and a second valve member 68 are coaxially disposed within valve housing 62 along longitudinal axis 58. As shown, base 106 of valve stem 36 is operably coupled to spacer 64 to rotate therewith, and spacer 64 is operably coupled to first valve member 66 to rotate therewith. The rotation of first valve member 66 relative to second valve member 68 provides control of fluid flow through valve housing 62. As such, valve stem 36 is configured to rotate spacer 64 which, in turn, rotates first valve member 66 about longitudinal axis 58 to control the flow of fluid through valve housing 62.

Referring again to FIGS. 6 and 7, shaft 108 of valve stem 36 is configured to be received by inner opening 94 of clamping portion 40 to thereby couple valve stem 36 to collet 34. As shown, an outer surface 100 of shaft 108 is configured to cooperate with inner surface 95 of clamping portion 40 to thereby rotationally lock collet 34 to valve stem 36. Illustratively, outer surface 100 of shaft 108 is substantially D-shaped, although shaft 108 may have a circular or double D-shaped outer surface 100. Alternatively, a spline connection may be used to rotationally lock shaft 108 to clamping portion 40. In the illustrated embodiment, inner opening 94 of clamping portion 40 is sized to provide a tight fit to valve stem 36. The flexibility of second body 132 relative to first body 130, as noted above, allows clamping portion 40 to provide an initial radial holding force on valve stem 36 when assembled. Alternatively, inner opening 94 may be sized to provide a loose fit to valve stem 36 and little or no radial holding force.

In assembly, the rotation of collet 34 thereby rotates valve stem 36 and first valve member 66 to control the flow of fluid through valve housing 62. Stop member 42 of collet 34 is configured to selectively engage limit stop 120 to limit rotation of valve stem 36. As shown, limit stop 120 of valve cap 60 extends upwardly from cap base 122 and includes a cap end wall 116 and opposing end surfaces 112. In assembly, end wall 104 of clamping portion 40 is disposed adjacent to cap end wall 116, and opposing end surfaces 118 of stop member 42 are configured to selectively engage surfaces 112 of limit stop 120. Cooperation between stop member 42 and limit stop 120 defines a path of rotational travel for valve stem 36 and, as such, first valve member 66. In the illustrated embodiment, the path of rotational travel is limited to less than approximately 90 degrees.

Figure 3A:
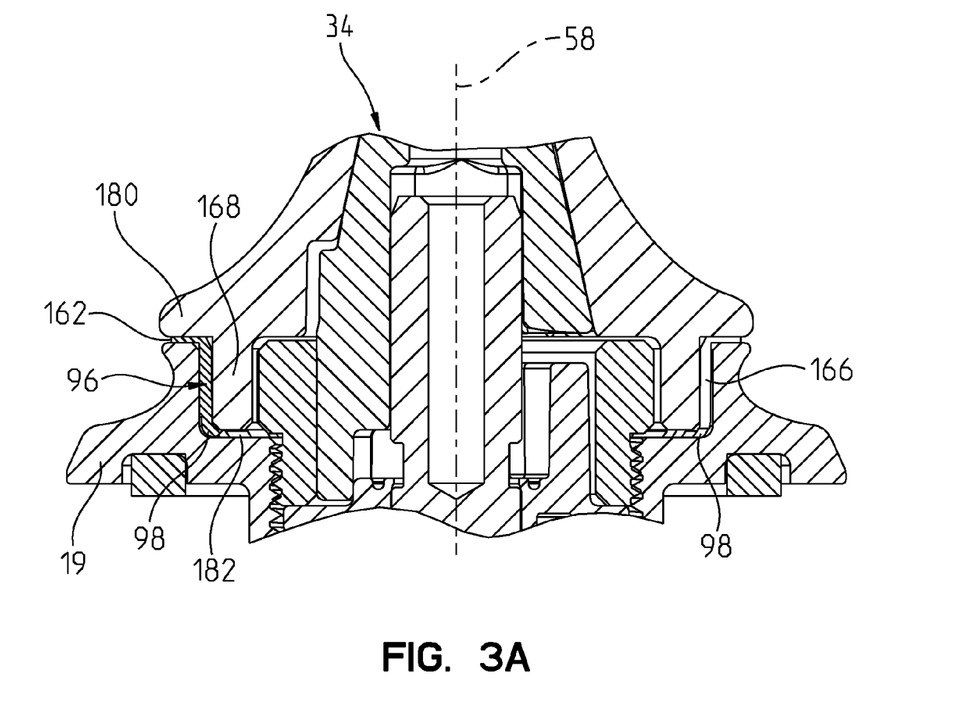
FIG. 3A is a detailed cross-sectional view of FIG. 3.
Figure 4:
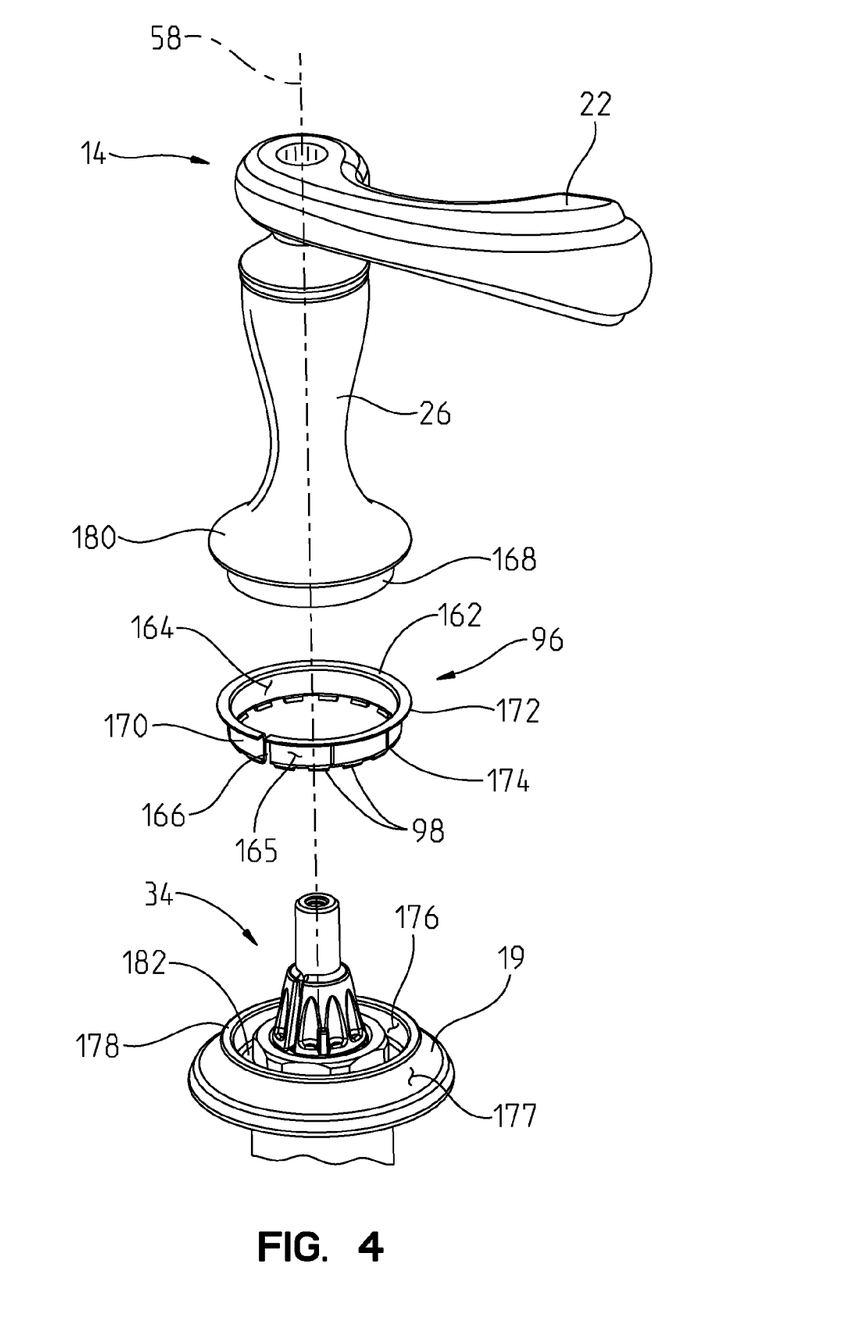
FIG. 4 is a partially exploded top perspective view of a glide ring positioned between the faucet handle and the collet.

Referring to FIGS. 3, 3A, and 4, a glide ring 96 is disposed between handle body 26 and trim piece or escutcheon 19. Escutcheon 19 is disposed between faucet handle 14 and sink deck 18, as shown in FIG. 1. Escutcheon 19 includes an annular wall 178 including an inner surface 176 and an outer surface 177. Escutcheon 19 also includes a surface 182 extending radially inwardly from wall 178. Glide ring 96 includes a cylindrical side wall 170 having opposing first and second ends 172 and 174, respectively, centered along longitudinal axis 58. Side wall 170 includes an inner surface 164 and an outer surface 165. A flange 162 extends radially outwardly from first end 172 of side wall 170, and a plurality of circumferentially spaced tabs 98 extend longitudinally outwardly from second end 174 of side wall 170. In the illustrated embodiment, tabs 98 are substantially resilient or flexible. Glide ring 96 further includes a slot 166 in side wall 170 to provide glide ring 96 with radial flexibility. Glide ring 96 may be made of a polymer or any other suitable flexible material.

Figure 8:
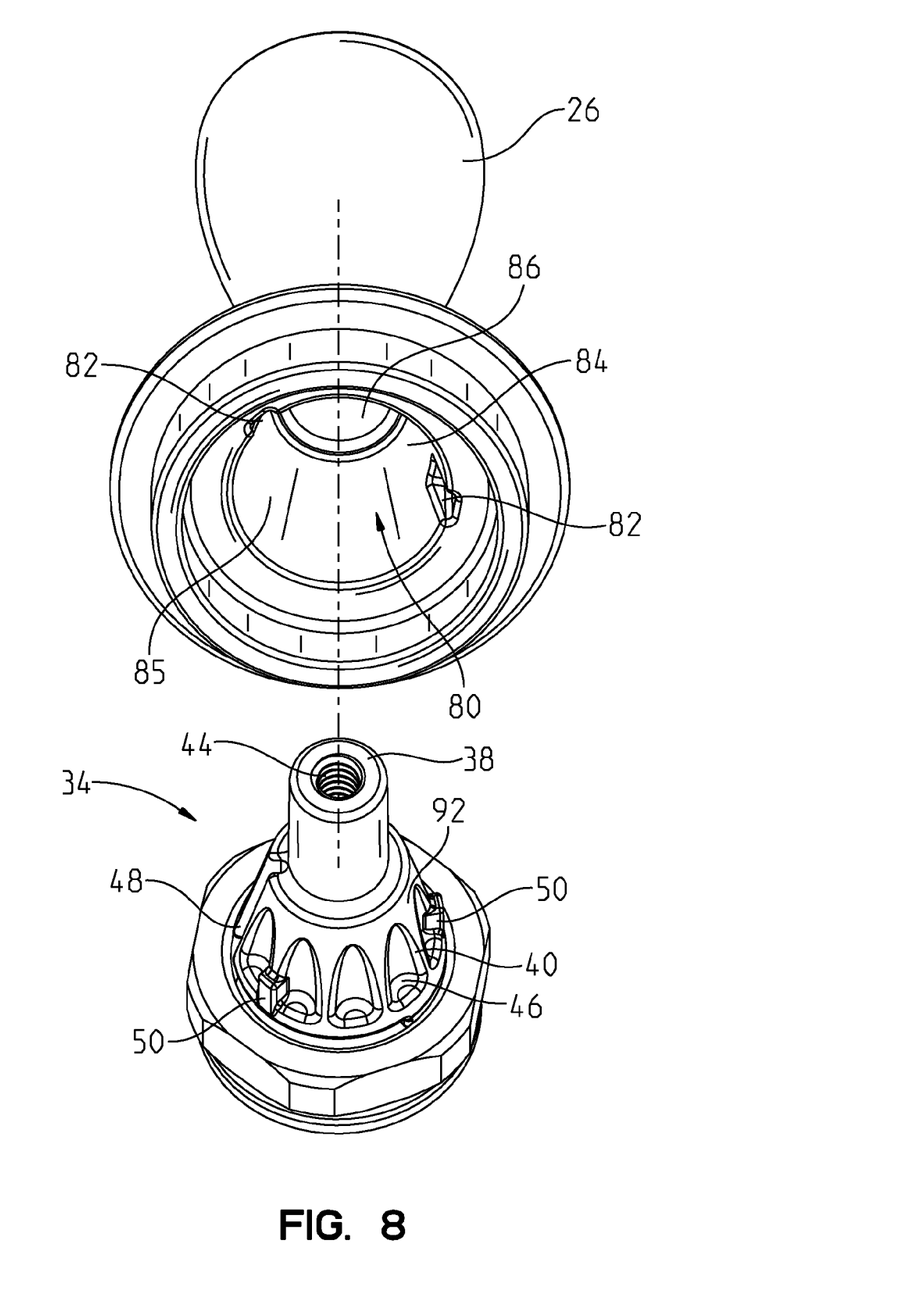
FIG. 8 is a partially exploded perspective view showing the faucet handle positioned above the collet of FIG. 2.

Referring to FIGS. 2, 3, and 8, collet 34 is configured to be received within a receiving port or chamber 80 of handle body 26. In the illustrated embodiment, receiving chamber 80 is sized to provide a tight tolerance or fit between handle body 26 and collet 34. Receiving chamber 80 includes a substantially cylindrical portion 86 configured to receive stem portion 38 of collet 34, and a substantially tapered portion 84 axially spaced from portion 86 and configured to receive clamping portion 40 of collet 34. In the illustrated embodiment, tapered outer surface 92 of clamping portion 40 is tapered at a different angle than the angle of a tapered inner surface 85 of tapered portion 84 relative to longitudinal axis 58. Tapered portion 84 includes slots 82 located on tapered surface 85 configured to cooperate with tabs 50 of collet 34 to facilitate proper angular positioning of collet 34 relative to handle body 26. In assembly, the cooperation of tabs 50 and slots 82 rotationally locks collet 34 to receiving chamber 80 of handle body 26. Tabs 50 and slots 82 may be configured to rotationally lock collet 34 to receiving chamber 80 of handle body 26 in one of a plurality of positions. By eliminating tabs 50, infinite incremental adjustment of handle body 26 relative to collet 34 is facilitated.

In the illustrated embodiment, collet 34 is secured to faucet handle 14 by a fastener 32, such as a bolt or screw. As illustrated, fastener 32 includes a head 57 and a shaft 59 having threads 55 and a smooth surface 56. Faucet handle 14 includes an opening 33 extending through lever 22 and handle body 26 along longitudinal axis 58. As best shown in FIG. 3, fastener 32 extends through opening 33 of faucet handle 14 and mates with stem portion 38 of collet 34, thereby securing collet 34 to faucet handle 14. Threaded opening 44 of stem portion 38 is configured to receive fastener 32 and engage threads 55 of fastener 32. Opening 33 includes a ledge 74 to provide a seat for head 57 of fastener 32, thereby fixing the longitudinal position of fastener 32 relative to faucet handle 12 as collet 34 is tightened into faucet handle 14. A fastener cap 30 is disposed in opening 33 over head 57 to cover fastener 32.

In operation, as fastener 32 is tightened to collet 34, stem portion 38 is pulled axially upwardly into cylindrical portion 86 of handle body 26, and clamping portion 40 is pulled upwardly into tapered portion 84 of handle body 26. Tapered surface 85 of receiving chamber 80 engages tapered outer surface 92 of clamping portion 40, thereby causing handle body 24 to provide a radial force on clamping portion 40. Clamping portion 40 thereby grips and provides a radial holding force on valve stem 36. As fastener 32 is tightened to collet 34, the radial holding force on valve stem 36 is strengthened until valve stem 36 is ultimately secured to faucet handle 14. Grooves 46 located in outer surface 92 of clamping portion 40 provide evenly distributed contact points between tapered outer surface 92 of collet 34 and tapered surface 85 of receiving chamber 80. As such, the radial force on clamping portion 40 is substantially evenly distributed across outer surface 92.

In the illustrative embodiment without tabs 50 engaging slots 82, collet 34 is movable along the longitudinal axis 58 between an unlocked mode and a locked mode when received within receiving chamber 80 of handle body 26. Handle body 26 may be rotated about longitudinal axis 58 at any incremental angle relative to collet 34 prior to fastener 32 tightening collet 34 into frictional locking engagement with receiving chamber 80 of handle body 26. As such, in the unlocked mode the user may infinitely incrementally adjust the angular orientation of handle body 26 relative to collet 34 within a given range of motion for proper positioning on sink deck 18. Illustratively, the range of motion is 360 degrees, but may vary through the use of stop members (not shown). In the locked mode, handle body 26 is rotationally locked to collet 34. A holding device other than collet 34 may be alternatively used.

Lever 22 may also be oriented at any angle relative to handle body 26 when tightened to handle body 26 via fastener 32. As fastener 32 is tightened, collet 34 and valve cartridge 102 are pulled up into receiving chamber 80, thereby tightening handle body 26 to lever 22. Referring again to FIGS. 3, 3A, and 4, glide ring 96 functions as a spacer between handle body 26 and escutcheon 19 to prevent handle body 26 from contacting or jamming into escutcheon 19 and sink deck 18 as fastener 32 is tightened. In assembly, flange 162 is disposed between a lip 180 of handle body 26 and wall 178 of escutcheon 19. Inner surface 164 of glide ring 96 is disposed adjacent to a coupling portion 168 of handle body 26, and outer surface 165 of glide ring 96 is disposed adjacent to inner surface 176 of escutcheon 19. Slot 166 allows glide ring 96 to fit snugly or tightly to coupling portion 168 of handle body 26. As fastener 32 is tightened, tabs 98 of glide ring 96 engage surface 182 of escutcheon 19 to resist and ultimately prevent further axial movement of handle body 26 towards escutcheon 19. As such, tabs 98 of glide ring 96 provide a spring bias or spring load between handle body 26 and escutcheon 19 to prevent handle body 26 from contacting or jamming into escutcheon 19. Glide ring 96 thereby functions to reduce friction between faucet handle 14 and sink deck 18, allowing smooth rotation of faucet handle 14 relative to sink deck 18.

Although the invention has been described in detail with reference to certain preferred embodiments, variations and modifications exist within the spirit and scope of the invention as described and defined in the following claims.

The invention claimed is:

1. A faucet assembly comprising:
   a handle body having a receiving chamber defining a longitudinal axis;
   a valve assembly including a valve stem; and
   a collet having a coupling portion and a clamping portion, the clamping portion having an inner opening receiving the valve stem and a frusto-conical outer surface received within the receiving chamber of the handle body, and wherein axial movement of the collet into the receiving chamber causes a radial force on the clamping portion to grip the valve stem, and the coupling portion threadedly receives a fastener to pull the collet toward the receiving chamber of the handle body.

2. The faucet assembly of claim 1, wherein the clamping portion has a substantially tapered outer surface.

3. The faucet assembly of claim 2, wherein the clamping portion has a plurality of grooves located in the substantially tapered outer surface.

4. The faucet assembly of claim 2, wherein the receiving chamber has a substantially tapered portion for cooperating with the substantially tapered outer surface of the clamping portion.

5. The faucet assembly of claim 4, wherein the substantially tapered outer surface of the clamping portion is tapered at an angle different than the substantially tapered portion of the receiving chamber relative to the longitudinal axis.

6. The faucet assembly of claim 1, wherein the collet is coupled to the handle body with a fastener.

7. The faucet assembly of claim 6, wherein the collet further includes a coupling portion having an internally threaded portion for receiving the fastener.

8. The faucet assembly of claim 1, wherein the clamping portion has at least one elongated slot.

9. The faucet assembly of claim 1, wherein the collet includes a stop member configured to cooperate with a limit stop in the valve assembly to thereby limit rotational movement of the collet relative to the valve assembly.

10. The faucet assembly of claim 1, wherein the clamping portion of the collet has an inner opening configured to receive the valve stem and prevent rotation of the valve stem relative to the collet.

11. The faucet assembly of claim 1, wherein the collet is made of a polymer.

12. The faucet assembly of claim 1, wherein the valve stem is operably coupled to a valve member to control a flow of water.

13. The faucet assembly of claim 1 further comprising:
a trim piece; and
a glide ring, wherein the glide ring is disposed between the handle body and the trim piece.

14. A faucet assembly comprising:
a handle body having a receiving chamber defining a longitudinal axis;
a valve assembly including a valve stem; and
a collet having a clamping portion for receiving the valve stem, wherein the clamping portion is received within the receiving chamber of the handle body, and wherein axial movement of the collet into the receiving chamber causes a radial force on the clamping portion to grip the valve stem, and wherein the collet includes a tab configured to cooperate with a slot in the receiving chamber of the handle body and thereby rotationally lock the collet to the receiving chamber.

15. The faucet assembly of claim 14, wherein the collet is rotationally locked to the receiving chamber of the handle body in one of a plurality of positions.

16. A collet for holding a faucet handle body to a valve stem, wherein the faucet handle body has a receiving chamber having a substantially tapered portion, the collet comprising:
a coupling portion for securing the collet to the faucet handle body;
a clamping portion for receiving the valve stem; and
wherein the clamping portion has a substantially tapered outer surface configured to cooperate with the substantially tapered portion of the receiving chamber and thereby clamp the clamping portion onto the valve stem.

17. The collet of claim 16, wherein the clamping portion has a plurality of grooves located in the substantially tapered outer surface.

18. The collet of claim 16, wherein the substantially tapered outer surface of the clamping portion is tapered at an angle different than the substantially tapered portion of the receiving chamber relative to a longitudinal axis.

19. The collet of claim 16, wherein the clamping portion has at least one elongated slot.

20. The collet of claim 16, wherein the clamping portion of the collet has an inner opening configured to receive the valve stem and prevent rotation of the valve stem relative to the collet.

21. The collet of claim 16, wherein the collet is made of a polymer.

22. The collet of claim 16, wherein the valve stem is operably coupled to a valve member to control a flow of water.

23. A collet for holding a faucet handle body to a valve stem, wherein the faucet handle body has a receiving chamber having a substantially tapered portion, the collet comprising:
a coupling portion for securing the collet to the faucet handle body;
a clamping portion for receiving the valve stem, wherein the clamping portion has a substantially tapered outer surface configured to cooperate with the substantially tapered portion of the receiving chamber and thereby clamp the clamping portion onto the valve stem; and
a tab configured to cooperate with a slot in the receiving chamber of the handle body and thereby rotationally lock the collet to the receiving chamber.

24. A faucet assembly comprising:
a handle body having a receiving chamber, wherein the receiving chamber has a substantially tapered inner surface;
a valve assembly including a valve stem; and
a collet having a coupling portion for securing the collet to the handle body and a clamping portion for receiving the valve stem, wherein the clamping portion has a substantially tapered outer surface configured to cooperate with the substantially tapered inner surface of the receiving chamber to clamp the clamping portion onto the valve stem.

25. The faucet assembly of claim 24, wherein the collet is coupled to the handle body with a fastener.

26. The faucet assembly of claim 25, wherein the collet further includes a coupling portion having an internally threaded portion for receiving the fastener.

27. The faucet assembly of claim 24, wherein the clamping portion of the collet has an inner opening configured to receive the valve stem and prevent rotation of the valve stem relative to the collet.

28. The faucet assembly of claim 24 further comprising:
a trim piece; and
a glide ring, wherein the glide ring is disposed between the handle body and the trim piece.

29. The faucet assembly of claim 28, wherein the glide ring includes a plurality of tabs configured to cooperate with a surface of the trim piece to prevent the handle body from contacting the trim piece.

30. The faucet assembly of claim 29, wherein the tabs are resilient to provide a spring bias between the handle body and the trim piece.

31. The faucet assembly of claim 28, wherein the glide ring includes a slot to provide radial flexibility to the glide ring.

32. A faucet assembly comprising:
a handle body having a receiving chamber defining a longitudinal axis;

a valve assembly including a valve stem; and a holding device for holding the handle body to the valve stem, wherein the holding device is received within the receiving chamber of the handle body and is movable in a direction parallel to the longitudinal axis from an unlocked mode wherein the handle body is infinitely rotationally adjustable within a range of motion about the longitudinal axis relative to the holding device, to a locked mode wherein the handle body is rotationally locked to the holding device, the holding device including a clamping portion having a tapered outer surface that cooperates with an inner surface of the receiving chamber to place the holding device in the locked mode.

33. The faucet assembly of claim 32, wherein a fastener couples the holding device to the handle body.

34. The faucet assembly of claim 33, wherein the fastener is tightened to move the holding device from the unlocked mode to the locked mode.

35. The faucet assembly of claim 32, wherein in the locked mode the holding device is clamped to the valve stem.

36. The faucet assembly of claim 32, wherein the valve stem is operably coupled to a valve member to control a flow of water.

37. The faucet assembly of claim 32, wherein the holding device is a collet.

38. The faucet assembly of claim 32 further comprising:
a trim piece; and
a glide ring, wherein the glide ring is disposed between the handle body and the trim piece.

\* \* \* \* \*